(12) United States Patent
Liang

(10) Patent No.: US 11,733,862 B2
(45) Date of Patent: Aug. 22, 2023

(54) INFORMATION DISPLAY METHOD AND TERMINAL

(71) Applicant: VIVO MOBILE COMMUNICATION CO., LTD., Guangdong (CN)

(72) Inventor: Weitao Liang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 0 days.

(21) Appl. No.: 17/387,108

(22) Filed: Jul. 28, 2021

(65) Prior Publication Data

US 2021/0357115 A1  Nov. 18, 2021

Related U.S. Application Data

(63) Continuation of application No. PCT/CN2020/072176, filed on Jan. 15, 2020.

(30) Foreign Application Priority Data

Jan. 31, 2019  (CN) .......................... 201910100621.X

(51) Int. Cl.
*G06F 3/0483* (2013.01)
*G06F 3/01* (2006.01)
(Continued)

(52) U.S. Cl.
CPC .......... *G06F 3/04886* (2013.01); *G06F 3/017* (2013.01); *G06F 3/0481* (2013.01);
(Continued)

(58) Field of Classification Search
CPC .............. G06F 3/0482; G06F 3/04817; G06F 3/04845; G06F 3/04842; G06F 3/0485;
(Continued)

(56) References Cited

U.S. PATENT DOCUMENTS

| 3,809,556 A | 5/1974 | Pressment et al. |
| 9,348,504 B2 | 5/2016 | Kwak et al. |

(Continued)

FOREIGN PATENT DOCUMENTS

| CN | 102360264 A | 2/2012 |
| CN | 102868821 A | 1/2013 |

(Continued)

OTHER PUBLICATIONS

International Search Report and Written Opinion of the International Searching Authority regarding International Paten Application No. PCT/CN2020/072176, dated Apr. 15, 2020. Translation provided by Bohui Intellectual Property.

(Continued)

*Primary Examiner* — Dismery Mercedes
(74) *Attorney, Agent, or Firm* — Harness, Dickey & Pierce, P.L.C.

(57) ABSTRACT

An information display method includes: obtaining target information in an information presentation page, the information presentation page being used to present information posted by at least one account; and displaying, in the information presentation page, a thumbnail corresponding to each piece of target information. The thumbnail includes information content extracted from the target information.

13 Claims, 5 Drawing Sheets

(51) Int. Cl.
  *G06F 3/0481* (2022.01)
  *G06F 3/0482* (2013.01)
  *G06F 16/583* (2019.01)
  *G06F 3/04886* (2022.01)
  *G06F 3/04842* (2022.01)
  *G06F 3/04883* (2022.01)
  *G06F 3/04845* (2022.01)
  *G06F 3/0484* (2022.01)

(52) U.S. Cl.
  CPC .......... *G06F 3/0483* (2013.01); *G06F 3/0484* (2013.01); *G06F 3/04842* (2013.01); *G06F 3/04845* (2013.01); *G06F 3/04883* (2013.01); *G06F 16/583* (2019.01); *G06F 2203/04803* (2013.01)

(58) Field of Classification Search
  CPC ......... G06F 2203/04803; G06F 3/0483; G06F 3/04886; G06F 3/0481; G06F 1/1647; G06F 3/041; G06F 16/583; G06F 3/017; G06F 16/783; G06F 16/5866; G06F 3/0488; G09G 3/20
  See application file for complete search history.

(56) References Cited

U.S. PATENT DOCUMENTS

| | | | | |
|---|---|---|---|---|
| 2010/0182265 A1* | 7/2010 | Kim | ...................... | G06F 1/1641 345/1.3 |
| 2010/0259562 A1* | 10/2010 | Miyazawa | .......... | G06F 3/04883 345/173 |
| 2010/0262928 A1 | 10/2010 | Abbott | | |
| 2014/0101575 A1* | 4/2014 | Kwak | .................. | G06F 3/0486 715/761 |
| 2014/0109012 A1* | 4/2014 | Choudhary | ......... | G06F 3/04817 715/838 |
| 2014/0143265 A1* | 5/2014 | Kim | .................... | G06F 3/04817 707/758 |
| 2014/0164966 A1* | 6/2014 | Kim | ...................... | G06F 16/168 715/769 |
| 2014/0372877 A1* | 12/2014 | Snyder | ................. | G06F 40/106 715/254 |
| 2015/0242090 A1 | 8/2015 | Suzuki et al. | | |
| 2016/0110010 A1* | 4/2016 | Lee | ..................... | H04M 1/0235 345/173 |
| 2016/0275991 A1* | 9/2016 | Hwang | ............... | G06F 3/04842 |
| 2017/0068322 A1* | 3/2017 | Steinberg | ............. | G06F 3/0304 |
| 2017/0098269 A1 | 4/2017 | Kim | | |
| 2018/0095650 A1* | 4/2018 | Park | .................... | G06F 3/04842 |
| 2018/0181283 A1* | 6/2018 | Jang | ..................... | G06F 3/0414 |
| 2018/0364809 A1* | 12/2018 | Nicholson | ............... | G06F 3/017 |
| 2020/0042095 A1* | 2/2020 | Ang | ........................ | G06F 3/017 |
| 2020/0168178 A1* | 5/2020 | Yamada | .................. | G09G 5/14 |

FOREIGN PATENT DOCUMENTS

| | | |
|---|---|---|
| CN | 103176699 A | 6/2013 |
| CN | 103729157 A | 4/2014 |
| CN | 104965649 A | 10/2015 |
| CN | 105302428 A | 2/2016 |
| CN | 105988679 A | 10/2016 |
| CN | 106055206 A | 10/2016 |
| CN | 106126566 A | 11/2016 |
| CN | 106227423 A | 12/2016 |
| CN | 106406712 A | 2/2017 |
| CN | 106878543 A | 6/2017 |
| CN | 107193519 A | 9/2017 |
| CN | 107241494 A | 10/2017 |
| CN | 107272946 A | 10/2017 |
| CN | 107861668 A | 3/2018 |
| CN | 108170392 A | 6/2018 |
| CN | 108280136 A | 7/2018 |
| CN | 109040445 A | 12/2018 |
| CN | 109828706 A | 5/2019 |
| EP | 2736235 A1 | 5/2014 |

OTHER PUBLICATIONS

First Office Action regarding Chinese Patent Application No. 201910100621.X, dated May 11, 2020. Translation provided by Bohui Intellectual Property.

Second Office Action regarding Chinese Patent Application No. 201910100621.X, dated Oct. 12, 2020. Translation provided by Bohui Intellectual Property.

Supplementary European Search Report regarding Patent Application No. 20749048.3-1203/3920013; PCT/CN2020/072176, dated Feb. 16, 2022.

* cited by examiner

INFORMATION DISPLAY METHOD AND TERMINAL

CROSS-REFERENCE TO RELATED APPLICATIONS

This application is a Bypass Continuation Application of PCT/CN2020/072176, filed on Jan. 15, 2020, which claims priority to Chinese Patent Application No. 201910100621.X, filed on Jan. 31, 2019, which are incorporated herein by reference in their entirety.

TECHNICAL FIELD

The present disclosure relates to the field of communications technologies, and in particular, to an information display method and a terminal.

BACKGROUND

With the rapid development of the Internet, social applications play an increasingly important role in people's lives. Users can present information about their daily lives on social platforms such as Moments and Activities.

SUMMARY

Embodiments of the present disclosure provide an information display method and a terminal.

According to a first aspect, an embodiment of the present disclosure provides an information display method, applied to a terminal having a display screen, where the information display method includes:

obtaining target information in an information presentation page, where the information presentation page is used to present information posted by at least one account; and displaying, in the information presentation page, a thumbnail corresponding to each piece of target information, where the thumbnail includes information content extracted from the target information.

According to a second aspect, an embodiment of the present disclosure provides a terminal having a display screen, where the terminal includes: an obtaining module configured to obtain target information in an information presentation page, where the information presentation page is used to present information posted by at least one account; and a first display module configured to display, in the information presentation page, a thumbnail corresponding to each piece of target information, where the thumbnail includes information content extracted from the target information.

According to a third aspect, an embodiment of the present disclosure further provides a terminal, including a processor, a memory, and a computer program that is stored in the memory and executable on the processor. When the computer program is executed by the processor, the steps of the information displaying method described above are implemented.

According to a fourth aspect, an embodiment of the present disclosure further provides a non-transitory computer-readable storage medium. The non-transitory computer-readable storage medium stores a computer program, and when the computer program is executed by a processor, the steps of the information displaying method described above are implemented.

DETAILED DESCRIPTION OF EMBODIMENTS

The following clearly describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure shall fall within the protection scope of the present disclosure.

It should be noted that, in the specification and claims, "and/or" is used to indicate at least one of connected objects, for example, A and/or B and/or C indicates seven cases: only A, only B, only C, both A and B, both B and C, both A and C, and A, B and C.

The application of Moments is accompanied by a great increase in the amount of information generated. At present, major social applications use a display mode in which new Moments messages are sorted in a display page by update time, and users need to manually swipe down to view the Moments.

However, due to a limited screen area, a display screen can only display content of one or two messages at a time. If a user has many contacts, a lot of information content will be displayed in a display page, and the user often has to swipe for a long time to find what he/she is truly interested in. A large amount of useless information interferes with the user's browsing, and the user cannot quickly browse and view the large amount of content displayed in the display page.

Figure 1:
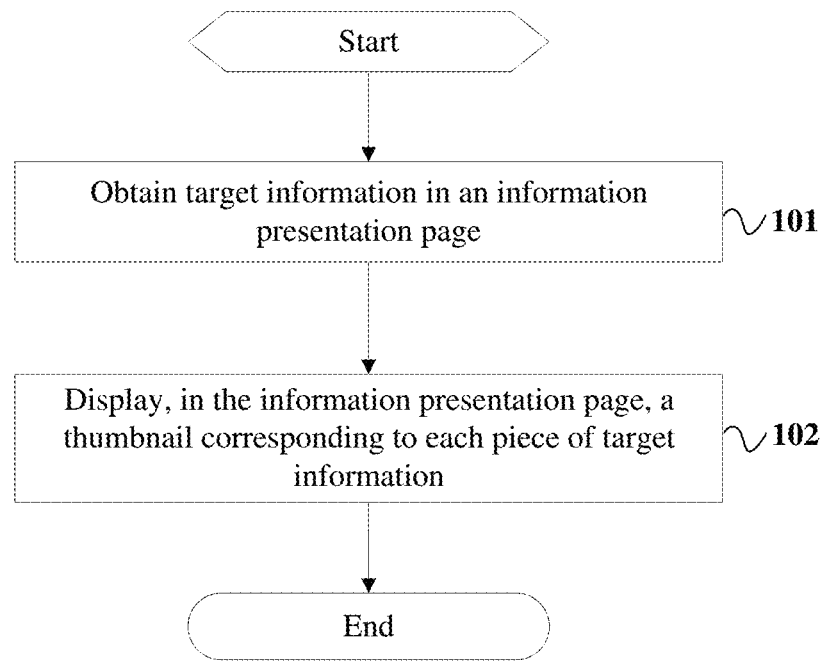
FIG. 1 is a flowchart of an information display method according to an embodiment of the present disclosure.

An embodiment of the present disclosure provides an information display method, applied to a terminal having a display screen. As shown in FIG. 1, the information display method includes the following steps.

Step 101: Obtain target information in an information presentation page.

Figure 4:
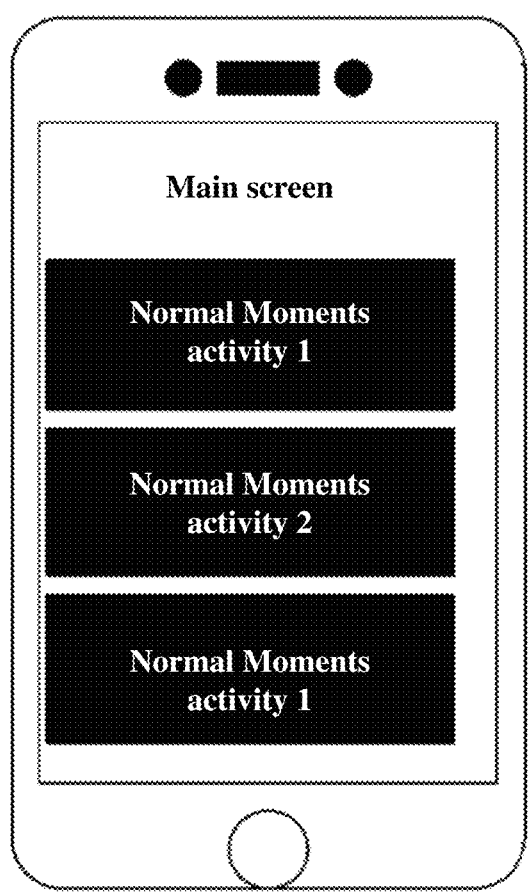
FIG. 4 is a schematic diagram of an information presentation page according to an embodiment of the present disclosure.

As shown in FIG. 4, the information presentation page is used to present information posted by at least one account, such as normal Moments listed in FIG. 4. Each account corresponds to a user.

Optionally, the information presentation page is a friend information presentation page, for example, a page of WeChat Moments or Qzone that displays information posted by different user accounts.

Optionally, there is a login account currently logged in to an application to which the information display method is applied, and the information posted by the at least one account is information posted by other accounts different from the login account. The other accounts are accounts having an association relationship with the login account. For example, the other accounts are accounts that have been added as friends. Certainly, the information presentation page may be a display page of information posted by different accounts in social applications or we-media application software. This is not specifically limited herein. In the following implementations, for example, the information presentation page is Moments for description.

The target information is at least a part of the information posted by the at least one account. The target information may be information posted by a specific account, or information posted by a specific account group, or information posted by the at least one account in a specific time period, such as updated information, or information including only pictures, or information including only text, etc. It can be understood that the updated information is information posted between a first moment and a second moment.

Optionally, for example, when the terminal enters the information presentation page, the information presentation page will automatically update information; when new information posted by users corresponding to different accounts is updated in the update operation, the updated information can be determined as the target information; and when no new information is updated in the update operation, the target information in this case is information updated in a previous update operation.

Step 102: Display a thumbnail corresponding to each piece of target information in the information presentation page.

Before the thumbnail corresponding to each piece of target information is displayed, the thumbnail corresponding to each piece of target information is generated. There is at least one piece of target information, and each piece of target information corresponds to one thumbnail.

Figure 2:
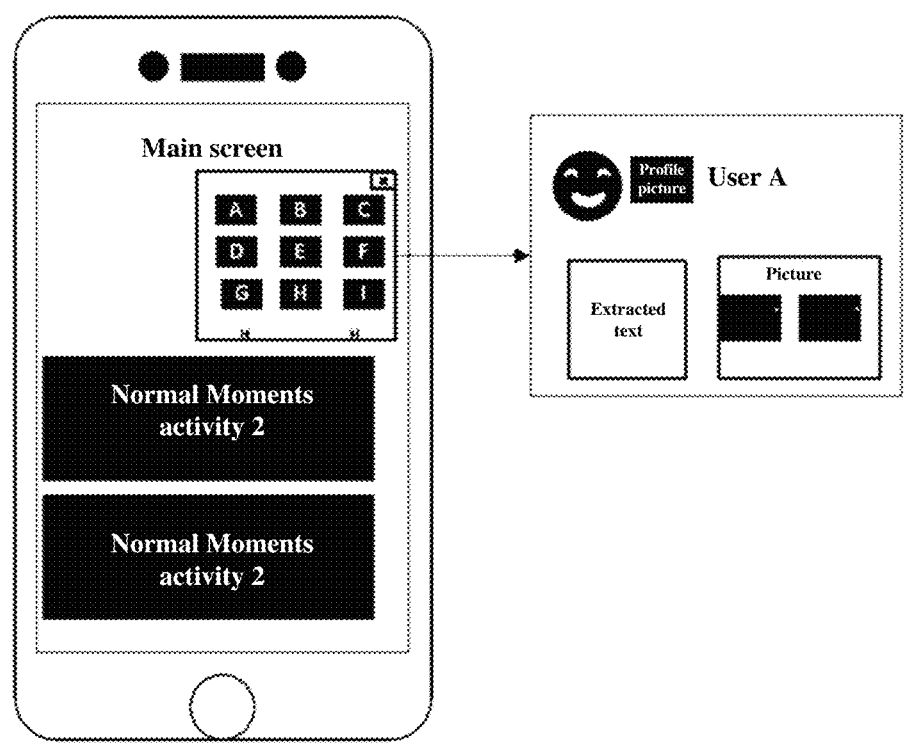
FIG. 2 shows a specific display interface of thumbnails according to an embodiment of the present disclosure.

The thumbnail includes information content extracted from the target information. The information content includes: account information of the target information, and/or extracted content of the target information, such as extracted keywords or extracted pictures, as shown in FIG. 2.

The account information may be account information of an account in the at least one account that corresponds to the target information. For example, the account information may be: a profile picture of the posting account, a username of the posting account, remark information of the posting account, etc.

A display area of the thumbnail is smaller than a display area of the corresponding target information. The target information may be displayed in the information presentation page. The thumbnail is displayed as floating on the display screen, and its presentation position can be adjusted and moved with an input by the user.

According to the foregoing information display method, the target information of the information presentation page is obtained, the thumbnail corresponding to each piece of target information is generated, and the generated thumbnail is displayed. This provides a user with a new information display effect and helps the user quickly browse and view a large amount of information in the information presentation page, which reduces inconvenience in the operation of the user viewing a wide variety of information, saves the user's time, avoids wasting more traffic, and reduces use cost.

As an optional implementation, that the thumbnail includes information content extracted from the target information includes the following:

the thumbnail includes a keyword extracted from the target information in a case where the target information includes text content; and/or the thumbnail includes a target image extracted from the target information in a case where the target information includes image content.

When the thumbnail includes the information content extracted from the target information, the extracted information content may be a keyword extracted from the target information, or a target picture extracted from the target information, or a keyword extracted from the target information and a target picture extracted from the target information. According to the extracted content, the thumbnail including the extracted information content is generated.

If a user activity (that is, information posted by the user) is only text information, extracted text content, a username, and a profile picture will be displayed in the thumbnail. If a user activity is only image content with more than one picture, the first two pictures will be selected for display, and if there is only one picture, the only one picture will be selected for display, and the extracted picture, a username, and a user profile picture will be displayed in the thumbnail. If a user activity is text and a picture, the extracted text content, a username, a profile picture, and a selected target picture will be displayed in the thumbnail, and if there is more than one picture, the first two pictures will be selected for display, or if there is only one picture, the only one picture will be shown.

When the content of the target information is different, the extracted content of the target information will change, and the content of the corresponding thumbnail will also be different due to this. Therefore, when seeing thumbnails with different content, the user can know immediately which type of information is posted by an information publisher, so that the user can quickly browse the content of a wide variety of newly generated information.

As an optional implementation, the displaying, in the information presentation page, a thumbnail corresponding to each piece of target information includes:

displaying, in a first display region of the information presentation page, the thumbnail corresponding to each piece of target information, where the first display region includes at least one display subregion, and each display subregion is used to display one thumbnail.

Optionally, the first display region may be a display box region or a specified display region, and the first display region is a display region that can move with an input by the user.

Optionally, the displaying, in a first display region of the information presentation page, the thumbnail corresponding to each piece of target information includes: arranging, according to a preset arrangement manner, the thumbnails in a predetermined presentation template for presentation, where the presentation template includes a plurality of presentation positions, and each presentation position is used to present one thumbnail.

Figure 5:
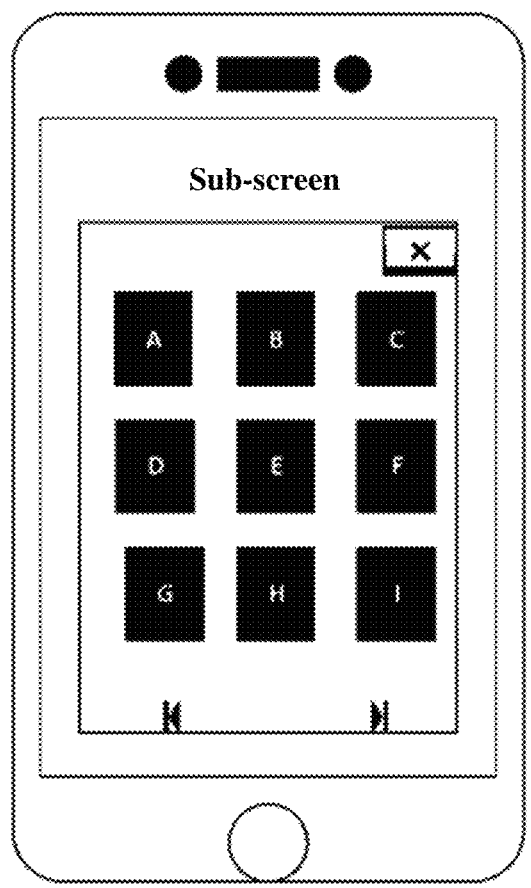
FIG. 5 is a schematic diagram of arrangement and layout of thumbnails according to an embodiment of the present disclosure.

As shown in FIG. 2 and FIG. 5, when the thumbnails are displayed, the predetermined presentation template may be a template in the form of a grid or a template in the form of a list, and displays the thumbnails in a grid view or in a list view. For the plurality of presentation positions in the presentation template, there are different arrangement and display positions for the presentation positions depending on different predetermined presentation forms of the presentation template. Thumbnails of updated information (namely, the target information) of user activities in Moments are displayed in each square of the grid. If the number of pieces of updated information of Moments exceeds the specified number of thumbnails that can be displayed in the grid, the thumbnails will be presented in a page turning form. A page turning key is set on the predetermined presentation template, and the display of presentation positions in a plurality of pages is achieved by means of "Previous" and "Next" in the page turning key. This achieves the display of thumbnails corresponding to a wide variety of updated information, and makes it convenient for the user to browse and view.

The predetermined presentation template is displayed on the display screen of the terminal in such a form that the predetermined presentation template can be dragged, zoomed, and closed. The user can drag the predetermined presentation template to adjust its position displayed on the display screen. The user can also drag and zoom the predetermined presentation template to adjust to an appropriate viewing size for the user to browse and view.

Optionally, the arranging, according to a preset arrangement manner, the thumbnails in a predetermined presentation template for presentation includes:

determining information display priorities of accounts corresponding to different target information; and arranging and displaying the thumbnails in the predetermined presentation template according to the information display priorities.

When the thumbnails are displayed, the information display priorities set by the user may be considered. According to sticky-on-top activities and a blocked list set by the user in advance, target information to be sticky on top will be displayed in the first page, and blocked target information will simply not be displayed, which satisfies the needs of the user and provides a better use experience.

For example, as an optional implementation, display regions of the information presentation page include the first display region and a second display region, and that the information presentation page is used to present information posted by at least one account includes the following:

the second display region is used to display the information posted by the at least one account; and the method further includes:

receiving a swipe operation for the information presentation page;

keeping, by the first display region, displaying the thumbnail corresponding to each piece of target information by skipping responding to the swipe operation; and updating, by the second display region, display content in response to the swipe operation.

In this process, the content displayed in the information presentation page may be updated on the display screen with an input by the user, and the content in the page is swiped for display. While the content in the information presentation page is swiped for display on the display screen, the display position of the at least one thumbnail is fixed. In this way, while the information presentation page is swiped up and down by means of the swipe input operation of the user, the thumbnail is not affected by a drag input by the user and does not interfere with the information presentation page, which is convenient for the user to operate.

As an optional implementation, before the displaying, in the information presentation page, a thumbnail corresponding to each piece of target information, the information display method further includes:

receiving a second input by the user on the information presentation page; displaying a target key in response to the second input; and receiving a third input by the user for the target key; and the displaying, in the information presentation page, a thumbnail corresponding to each piece of target information includes: displaying, in the information presentation page in response to the third input, the thumbnail corresponding to each piece of target information.

The target key may be a virtual key or a mechanical physical key. The target key is a thumbnail call-out display key. In this process, after the terminal enters the information presentation page, the display of the thumbnails is achieved by means of the invocation of the call-out display key and a trigger operation on the key by the user, and the terminal enters an information thumbnail display mode, to display the target information in the information presentation page in a thumbnail mode.

Optionally, when the thumbnails are arranged in a predetermined presentation template for presentation, the predetermined presentation template may be called out or displayed for use by itself according to the preference of the user, and the call-out display is performed by using the call-out display key, to display the thumbnails in the invoked predetermined presentation template.

The second input may be determined and obtained when a swipe operation, input by the user, of swiping from one side edge of the display screen of the terminal to the opposite side edge of the display screen is received, and the "call-out key" is displayed.

The third input may be a drag input, a long-press input, a single-tap input, and a double-tap input to the target key. Optionally, the target information is a new message posted by the at least one account, and after the obtaining target information in an information presentation page, the information display method further includes: directly and sequentially displaying the target information in the information presentation page. In this way, the thumbnail of the target information is displayed while the normal display of the target information is implemented, which is convenient for the user to quickly browse the target information and view the complete content of the updated information, and is convenient for the user to operate.

The displaying the thumbnail may include: displaying the thumbnail in the information presentation page. This implementation is applied to a case that the terminal has only one display screen.

However, when the terminal has two or more display screens, the information thumbnail is displayed in the following manner:

the terminal includes a first screen and a second screen, the information presentation page is displayed on the first screen, and after the displaying, in the information presentation page, a thumbnail corresponding to each piece of target information, the information display method further includes: receiving a first input by the user; and in response to the first input, turning on the second screen and displaying the thumbnail on the second screen.

The first input is used to wake up the second screen. The first screen (main screen) and the second screen (sub-screen) may be screens on the same side of the terminal. For example, the first screen and the second screen are both screens on the front of the terminal. Alternatively, the first screen and the second screen may be screens on different sides of the terminal. For example, the first screen is a screen on the front of the terminal, and the second screen is a screen on the back of the terminal. In specific cases, it may be set according to actual needs.

To make the display of the information thumbnail clearer and easier to view, when the terminal has two or more display screens, the information presentation page and the information thumbnail are displayed on different display screens. As shown in FIG. 4 and FIG. 5, when there are two display screens, the information presentation page is displayed on the first screen (main screen), and the thumbnail is displayed on the second screen (sub-screen). The second screen is woken up by the first input by the user. Before the first input by the user is received, the second screen is in a screen-off display state at this time. After the second screen becomes active, the predetermined presentation template may be displayed on the second screen to display the information thumbnail in the invoked predetermined presentation template. The plurality of screens help the user quickly browse and view the updated information.

Figure 3:
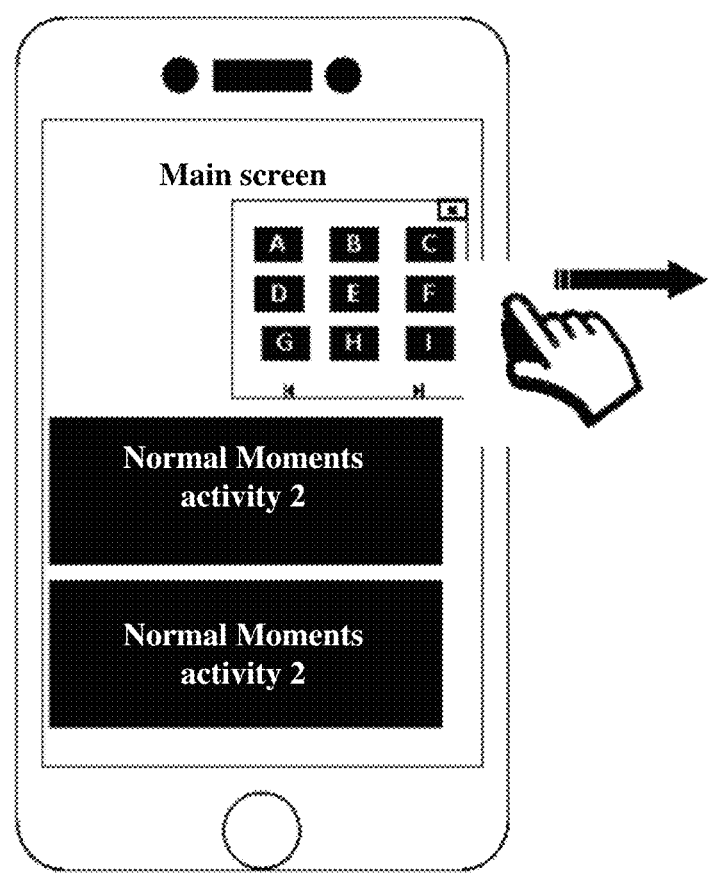
FIG. 3 is a schematic diagram of an operation of calling a second screen according to an embodiment of the present disclosure.

Optionally, the first input by the user may be as follows: the receiving a first input by the user includes:

receiving a drag input by the user dragging the thumbnail to a display edge of the first screen, and in a case where duration of a drag operation that the thumbnail is dragged to the display edge of the first screen is greater than specified duration, determining that the first input by the user is received, as shown in FIG. 3.

The specified duration may be 0.4 s to 0.5 s. The thumbnail is first displayed in the information presentation page, and the user may drag the thumbnail to the edge of the first screen and holds it for about 0.5 s, to start the second screen and present the thumbnail on the sub-screen. When the thumbnail is displayed in the predetermined presentation template, a drag input by the user dragging the predetermined presentation template to the display edge of the first screen is received, and in a case where duration of a drag operation that the predetermined presentation template is dragged to the display edge of the first screen is greater than the specified duration, it is determined that the first input by the user is received.

Alternatively, the receiving a first input by the user includes: in a case where a double tap of the user on the thumbnail is received, determining that the first input by the user is received.

The user double-taps the thumbnail to start the second screen, and the thumbnail is displayed on the second screen. When the thumbnail is displayed in the predetermined presentation template, when a double tap of the user on the predetermined presentation template is received, it is determined that the first input by the user is received.

Alternatively, the receiving a first input by the user includes: in a case where an obstruction within a first area range is detected in an exterior spatial region of the first screen, and then it is detected that the area of the obstruction gradually decreases to within a second area range, determining that the first input by the user is received.

The obstruction may be a palm. In a case where the obstruction within the first area range is detected in the exterior spatial region of the first screen, and then it is detected that the area of the obstruction gradually decreases to within the second area range, it is determined that a flip operation of the palm is detected, and it is determined that the third input by the user is received. Optionally, the user uses a palm to hang over the main screen, rotate it ninety degrees clockwise, and then the palm is vertical to the screen. A gesture of a palm hanging over the first screen, rotated ninety degrees clockwise, and then vertical to the first screen is herein referred to as a gesture of turning a book. Then the second screen is started and turned on, and the information thumbnail is output and displayed on the second screen, as shown in FIG. 5.

The embodiments of the present disclosure provide two implementations from the perspectives of a handheld single-screen device and dual-screen device of the user.

If the terminal is a single-screen device, when the user opens Moments, a thumbnail grid of Moments activities is provided in a blank part of a display page of Moments, to display content thumbnails of a publisher and information. This grid can be dragged, zoomed, and closed, and the user can drag its position according to actual needs. Thumbnails of several keywords of the content for the text type, and the first two pictures for the picture type are extracted for display. In this way, activities of more users can be displayed on one screen, which greatly increases the number of pieces of content displayed and helps the user quickly find content that he/she wants to view. If the user sets a sticky-on-top user, updated information of the sticky-on-top user will be displayed preferentially.

If the terminal is a dual-screen device, the user opens Moments on the first screen, and presents, on the second screen, the thumbnail grid of the updated information in Moments that is mentioned above; and the user quickly browses the thumbnail information of the updated information in Moments on the second screen. The multi-screen advantage is used to increase the display content and forms of Moments.

Optionally, after the displaying, in the information presentation page, a thumbnail corresponding to each piece of target information, the information display method further includes:

receiving a second input by the user selecting a target thumbnail from the thumbnail; and in response to the second input, updating display content of the information presentation page to first content, where the first content includes first target information corresponding to the target thumbnail.

In this process, in response to the second input, on the display screen, the information presentation page is directed to a display position of the first target information corresponding to the target thumbnail, and the first target information is displayed.

Before the second input is received, content displayed in the information presentation page is second content. The second content may be content presented in the information presentation page after the terminal enters the information presentation page, or one piece of display content updated and displayed in the information presentation page with the swipe input by the user, where the piece of display content includes at least one piece of second target information. After the second input is received, the at least one piece of second target information is updated and displayed as the first target information corresponding to the target thumbnail.

The target information corresponding to the target thumbnail has an information display position in the information presentation page, and complete display content of the target information corresponding to the target thumbnail is displayed at the information display position. When the user selects one target thumbnail from the thumbnails, the current display position of the information presentation page is directed to the information display position corresponding to the target thumbnail, which helps the user quickly find the information content that he/she wants to view, thereby saving the user's time and improving user experience, reducing the cost of information viewing, and providing a diverse manner of presenting Moments.

Figure 6:
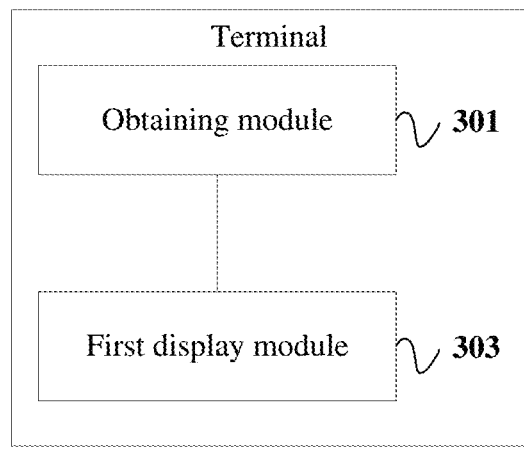
FIG. 6 is a structural block diagram of a terminal according to an embodiment of the present disclosure.

An embodiment of the present disclosure further provides a terminal having a display screen. As shown in FIG. 6, the terminal further includes: an obtaining module 301 and a first display module 302.

The obtaining module 301 is configured to obtain target information in an information presentation page, where the information presentation page is used to present information posted by at least one account.

The first display module 302 is configured to display, in the information presentation page, a thumbnail corresponding to each piece of target information.

The thumbnail includes information content extracted from the target information.

That the thumbnail includes information content extracted from the target information includes the following:

the thumbnail includes a keyword extracted from the target information in a case where the target information includes text content; and/or the thumbnail includes a target image extracted from the target information in a case where the target information includes image content.

The first display module 302 includes:

a first display submodule configured to display, in a first display region of the information presentation page, the thumbnail corresponding to each piece of target information, where the first display region includes at least one display subregion, and each display subregion is used to display one thumbnail.

Display regions of the information presentation page include the first display region and a second display region, and that the information presentation page is used to present information posted by at least one account includes the following:

the second display region is used to display the information posted by the at least one account; and the user equipment further includes:

a first receiving module configured to receive a swipe operation for the information presentation page; and a response module configured to: control the first display region to keep displaying the thumbnail corresponding to each piece of target information by skipping responding to the swipe operation; and control the second display region to update display content in response to the swipe operation.

The terminal further includes:

a second receiving module configured to receive a second input by the user on the information presentation page;

a second display module configured to display a target key in response to the second input; and a third receiving module configured to receive a third input by the user for the target key.

The first display module 302 includes:

a second display submodule configured to display, in the information presentation page in response to the third input, the thumbnail corresponding to each piece of target information.

The terminal includes a first screen and a second screen, the information presentation page is displayed on the first screen, and the terminal further includes:

a fourth receiving module configured to receive a first input by the user; and a third display module configured to: in response to the first input, turn on the second screen and display the thumbnail on the second screen.

Optionally, the fourth receiving module may be configured to: receive a drag input by the user dragging the thumbnail to a display edge of the first screen, and in a case where duration of a drag operation that the thumbnail is dragged to the display edge of the first screen is greater than specified duration, determine that the first input by the user is received; or in a case where a double tap of the user on the thumbnail is received, determine that the first input by the user is received; or in a case where an obstruction within a first area range is detected in an exterior spatial region of the first screen, and then it is detected that the area of the obstruction gradually decreases to within a second area range, determine that the first input by the user is received.

The terminal further includes:

a fifth receiving module configured to receive a second input by the user selecting a target thumbnail from the thumbnail; and an update module configured to: in response to the second input, update display content of the information presentation page to first content, where the first content includes first target information corresponding to the target thumbnail.

According to the terminal in this embodiment of the present disclosure, the target information of the information presentation page is obtained, the thumbnail corresponding to each piece of target information is generated, and the generated thumbnail is displayed. This provides a user with a new information display effect and helps the user quickly browse and view a large amount of information in the information presentation page, which reduces inconvenience in the operation of the user viewing a wide variety of information, saves the user's time, avoids wasting more traffic, and reduces use cost.

The terminal provided in this embodiment of the present disclosure can implement the processes of the embodiments of the foregoing information processing method, with the same technical effects achieved. To avoid repetition, details are not described again herein.

Figure 7:
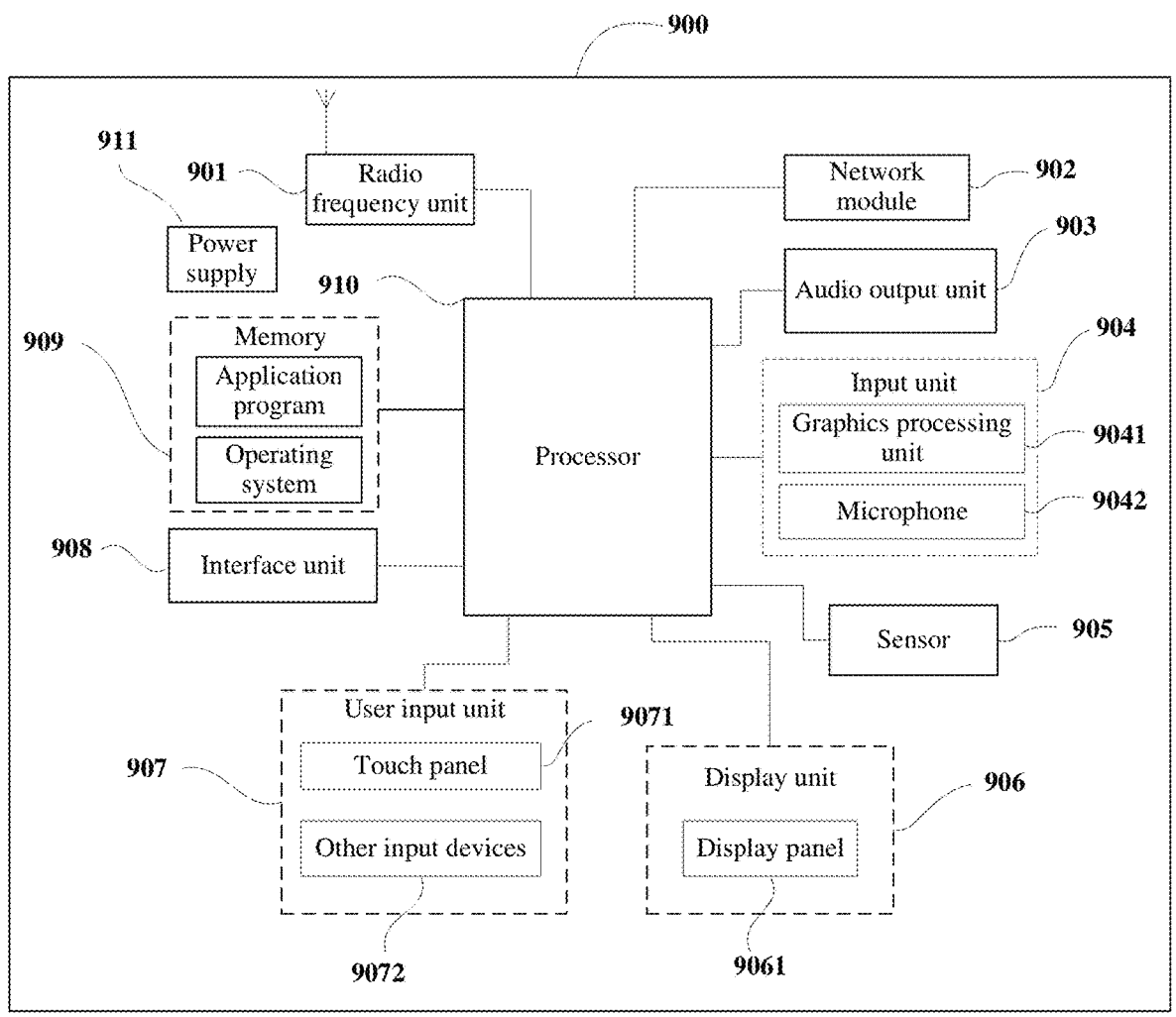
FIG. 7 is a schematic diagram of a hardware structure of a terminal according to an embodiment of the present disclosure.

FIG. 7 is a schematic diagram of a hardware structure of a terminal according to an embodiment of the present disclosure.

The terminal 900 includes but is not limited to components such as a radio frequency unit 901, a network module 902, an audio output unit 903, an input unit 904, a sensor 905, a display unit 906, a user input unit 907, an interface unit 908, a memory 909, a processor 910, and a power supply 911. Those skilled in the art may understand that the terminal structure shown in FIG. 7 does not constitute a limitation on the terminal. The terminal may include more or fewer components than those shown in the figure, or some components may be combined, or there may be a different component arrangement. In the embodiments of the present disclosure, the terminal includes, but is not limited to, a mobile phone, a tablet computer, a notebook computer, a palmtop computer, a vehicle-mounted terminal, a wearable device, a pedometer, or the like.

The processor 910 is configured to obtain target information in an information presentation page, where the information presentation page is used to present information posted by at least one account.

The display unit 906 is configured to display a thumbnail corresponding to each piece of target information. The thumbnail includes information content extracted from the target information.

Optionally, that the thumbnail includes information content extracted from the target information includes the following:

the thumbnail includes a keyword extracted from the target information in a case where the target information includes text content; and/or the thumbnail includes a target image extracted from the target information in a case where the target information includes image content.

Optionally, the display unit 906 may be configured to display, in a first display region of the information presentation page, the thumbnail corresponding to each piece of target information, where the first display region includes at least one display subregion, and each display subregion is used to display one thumbnail.

Optionally, display regions of the information presentation page include the first display region and a second display region, and that the information presentation page is used to present information posted by at least one account includes the following: the second display region is used to display the information posted by the at least one account; and the input unit 904 is configured to receive a swipe operation for the information presentation page; the display unit 906 may be configured to: control the first display region to keep displaying the thumbnail corresponding to each piece of target information by skipping responding to the swipe operation; and control the second display region to update display content in response to the swipe operation.

Optionally, the input unit 904 is configured to receive a second input by the user on the information presentation page; the display unit 906 is configured to display a target key in response to the second input; the input unit 904 is configured to receive a third input by the user for the target key; and the display unit 906 is configured to display, in the information presentation page in response to the third input, the thumbnail corresponding to each piece of target information.

Optionally, the terminal includes a first screen and a second screen, the information presentation page is displayed on the first screen; the input unit 904 is configured to receive a first input by the user; and the display unit 906 is configured to: in response to the first input, turn on the second screen and display the thumbnail in the second screen. Optionally, the input unit 904 is configured to receive a drag input by the user dragging the thumbnail to a display edge of the first screen, and in a case where duration of a drag operation that the thumbnail is dragged to the display edge of the first screen is greater than specified duration, determine that the first input by the user is received; or in a case where a double tap of the user on the thumbnail is received, determine that the first input by the user is received; or Amended an obstruction within a first area range is detected in an exterior spatial region of the first screen, and then it is detected that the area of the obstruction gradually decreases to within a second area range, determine that the first input by the user is received.

Optionally, the input unit 904 is configured to receive a second input by the user selecting a target thumbnail from the thumbnail; and the display unit 906 is configured to: in response to the second input, update display content of the information presentation page to first content, where the first content includes first target information corresponding to the target thumbnail.

According to the terminal in this embodiment of the present disclosure, the target information of the information presentation page is obtained, the thumbnail corresponding to each piece of target information is generated, and the generated thumbnail is displayed. This provides a user with a new information display effect and helps the user quickly browse and view a large amount of information in the information presentation page, which reduces inconvenience in the operation of the user viewing a wide variety of information, saves the user's time, avoids wasting more traffic, and reduces use cost.

It should be understood that, in the embodiments of the present disclosure, the radio frequency unit 901 may be configured to receive and send information or receive and send a signal in a call process. For example, after receiving downlink data from a base station, the radio frequency unit 901 sends the downlink data to the processor 910 for processing. In addition, the radio frequency unit 901 sends uplink data to the base station. Generally, the radio frequency unit 901 includes, but is not limited to, an antenna, at least one amplifier, a transceiver, a coupler, a low noise amplifier, a duplexer, and the like. In addition, the radio frequency unit 901 may further communicate with another device by using a wireless communications system and network.

The terminal provides wireless broadband Internet access for a user by using the network module 902, for example, helping the user send and receive an email, browsing a web page, and accessing streaming media.

The audio output unit 903 can convert audio data received by the radio frequency unit 901 or the network module 902 or stored in the memory 909 into an audio signal, and output the audio signal into sound. In addition, the audio output unit 903 can also provide audio output related to a specific function performed by the terminal 900 (for example, call signal receiving sound or message receiving sound). The audio output unit 903 includes a speaker, a buzzer, a receiver, and the like.

The input unit 904 is configured to receive audio or video signals. The input unit 904 may include a graphics processing unit (GPU) 9041 and a microphone 9042. The graphics processing unit 9041 processes image data of a static image or video obtained by an image capture apparatus (such as, a camera) in a video capture mode or an image capture mode. A processed image frame can be displayed on the display unit 906. The image frame processed by the graphics processing unit 9041 may be stored in the memory 909 (or another storage medium) or sent by using the radio frequency unit 901 or the network module 902. The microphone 9042 may receive sound and can process such sound into audio data. The processed audio data may be converted, in a call mode, into a format that can be sent by the radio frequency unit 901 to a mobile communication base station for output.

The terminal 900 further includes at least one sensor 905, such as an optical sensor, a motion sensor, and another sensor. The light sensor includes an ambient light sensor and a proximity sensor, where the ambient light sensor can adjust brightness of the display panel 9061 based on brightness of ambient light, and the proximity sensor can turn off the display panel 9061 and/or backlight when the terminal 900 moves towards the ear. As a type of motion sensor, an accelerometer sensor can detect magnitudes of accelerations in all directions (usually three axes), can detect a magnitude and a direction of gravity when the mobile phone is in a static state, and can be applied to mobile phone posture recognition (such as screen switching between portrait and landscape, related games, and magnetometer posture calibration), functions related to vibration recognition (such as pedometer and tapping), and the like. The sensor 905 may also include a fingerprint sensor, a pressure sensor, an iris sensor, a molecular sensor, a gyroscope, a barometer, a hygrometer, a thermometer, an infrared sensor, and the like. Details are not described herein.

The display unit 906 is configured to display information entered by a user or information provided for the user. The display unit 906 may include a display panel 9061, and the display panel 9061 may be configured in a form of liquid crystal display (LCD), organic light-emitting diode (OLED), or the like. The display panel 9061 may also be called display screen.

The user input unit 907 may be configured to receive inputted digit or character information and generate key signal input related to user setting and function control of the terminal. The user input unit 907 includes a touch panel 9071 and another input device 9072. The touch panel 9071 is also referred to as a touchscreen, and may collect a touch operation performed by a user on or near the touch panel 9071 (for example, an operation performed by a user on the touch panel 9071 or near the touch panel 9071 by using any proper object or accessory such as a finger or a stylus). The touch panel 9071 may include two parts: a touch detection apparatus and a touch controller. The touch detection apparatus detects a touch position of the user, detects a signal brought by the touch operation, and sends the signal to the touch controller. The touch controller receives touch information from the touch detection apparatus, converts the touch information into touch point coordinates, and sends the touch point coordinates to the processor 910, and can receive and execute a command sent by the processor 910. In addition, the touch panel 9071 may be implemented by using a plurality of types such as a resistive type, a capacitive type, an infrared ray type, and a surface acoustic wave type. The user input unit 907 may further include other input devices 9072 in addition to the touch panel 9071. The other input devices 9072 may include but are not limited to a physical keyboard, a functional key (such as a volume control key or a power on/off key), a trackball, a mouse, and a joystick. Details are not described herein.

Optionally, the touch panel 9071 can cover the display panel 9061. When detecting a touch operation on or near the touch panel 9071, the touch panel 9071 transmits the touch operation to the processor 910 to determine a type of a touch event. Then the processor 910 provides corresponding visual output on the display panel 9061 based on the type of the touch event. Although in FIG. 7, the touch panel 9071 and the display panel 9061 are used as two independent components to implement input and output functions of the terminal, in some embodiments, the touch panel 9071 and the display panel 9061 may be integrated to implement the input and output functions of the terminal. This is not specifically limited herein.

The interface unit 908 is an interface for connecting an external apparatus to the terminal 900. For example, the external apparatus may include a wired or wireless headset jack, an external power supply (or a battery charger) port, a wired or wireless data port, a memory card port, a port for connecting an apparatus having an identification module, an audio input/output (I/O) port, a video I/O port, and a headset jack. The interface unit 908 can be configured to receive an input (for example, data information and power) from the external apparatus and transmit the received input to one or more elements in the terminal 900, or transmit data between the terminal 900 and the external apparatus.

The memory 909 may be configured to store software programs and various data. The memory 909 may mainly include a program storage area and a data storage area. The program storage area may store an operating system, an application required by at least one function (such as a sound play function or an image play function), and the like. The data storage area may store data (such as audio data or an address book) created based on use of the mobile phone, and the like. In addition, the memory 909 may include a high-speed random access memory, and may further include a non-volatile memory, for example, at least one magnetic disk storage device, a flash memory device, or another volatile solid-state storage device.

The processor 910 is a control center of the terminal, and connects all parts of the entire terminal by using various interfaces and lines. By running or executing a software program and/or a module stored in the memory 909 and invoking data stored in the memory 909, the processor 910 performs various functions of the terminal and data processing, to perform overall monitoring on the terminal. The processor 910 may include one or more processing units. Optionally, the processor 910 may integrate an application processor and a modem processor. The application processor mainly processes an operating system, a user interface, an application program, and the like. The modem processor mainly processes wireless communication. It may be understood that, alternatively, the modem processor may not be integrated into the processor 910.

The terminal 900 may also include a power supply 911 (for example, a battery) that supplies power to various components. Optionally, the power supply 911 may be logically connected to the processor 910 through a power supply management system, to perform functions of managing charging, discharging, and power consumption through the power supply management system.

In addition, the terminal 900 includes some functional modules not shown. Details are not described herein.

Optionally, an embodiment of the present disclosure further provides a terminal, including a processor 910, a memory 909, and a computer program that is stored in the memory 909 and executable on the processor 910. When the computer program is executed by the processor 910, the processes of the foregoing information display method embodiment are implemented, with the same technical effect achieved. To avoid repetition, details are not described herein again.

An embodiment of the present disclosure further provides a non-transitory computer-readable storage medium. The non-transitory computer-readable storage medium stores a computer program. When the computer program is executed by a processor, the processes of the foregoing embodiments of the information display method are implemented, and a same technical effect can be achieved. To avoid repetition, details are not described herein again. The non-transitory computer-readable storage medium may be a read-only memory (ROM), a random access memory (RAM), a magnetic disk, an optical disc, or the like.

It should be noted that, in this specification, the terms "include", "comprise", or any of their variants are intended to cover a non-exclusive inclusion, so that a process, a method, an article, or an apparatus that includes a series of elements not only includes those elements but also includes other elements that are not expressly listed, or further includes elements inherent to such a process, method, article, or apparatus. In the absence of more restrictions, an element defined by the statement "including a . . . " does not exclude another same element in a process, method, article, or apparatus that includes the element.

By means of the foregoing description of the implementations, a person skilled in the art may clearly understand that the method in the foregoing embodiments may be implemented by software with a necessary general hardware platform. Certainly, the method in the foregoing embodiments may also be implemented by hardware. However, in many cases, the former is a preferred implementation. Based on such an understanding, the technical solutions of the present disclosure essentially or the part contributing to the related art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the foregoing specific implementations. The foregoing specific implementations are merely schematic instead of restrictive. Under enlightenment of the present disclosure, a person of ordinary skills in the art may make many forms without departing from the aims of the present disclosure and the protection scope of claims, all of which fall within the protection of the present disclosure.

The foregoing descriptions are merely optional implementations of the present disclosure. It should be noted that a person of ordinary skill in the art may make several improvements and polishing without departing from the principle of the present disclosure and the improvements and polishing shall fall within the protection scope of the present disclosure.

What is claimed is:

1. An information display method, applied to a terminal, wherein the method comprises:
    obtaining target information in an information presentation page, wherein the terminal comprises a first display screen and a second display screen, the information presentation page is displayed on the first display screen, and the information presentation page is used to present information posted by at least one account, and the target information is the information posted by the at least one account; and
    displaying, in the information presentation page, a thumbnail corresponding to each piece of target information, wherein
    the thumbnail comprises information content extracted from the target information; and
    the information presentation page comprises a first display region and a second display region;
    the displaying, in the information presentation page, the thumbnail corresponding to each piece of target information comprises:
    displaying, in the first display region of the information presentation page, the thumbnail corresponding to each piece of target information, wherein the first display region comprises at least one display subregion, and each display subregion is used to display one thumbnail;
    that the information presentation page is used to present information posted by at least one account comprises:
    the second display region being used to display the information posted by the at least one account; wherein
    the information display method further comprises:
    receiving a swipe operation on the information presentation page;
    keeping, by the first display region, displaying the thumbnail corresponding to each piece of target information by skipping responding to the swipe operation; and
    updating, by the second display region, display content in response to the swipe operation; wherein
    after the displaying, in the information presentation page, the thumbnail corresponding to each piece of target information, the information display method further comprises:
    receiving a first input by a user; and
    turning on the second display screen and displaying the thumbnail on the second display screen in response to the first input; wherein
    the turning on the second display screen and displaying the thumbnail on the second display screen in response to the first input comprises: turning on the second display screen and displaying the thumbnail on the second display screen in response to a gesture of a palm hanging over the first display screen, rotated ninety degrees clockwise, and then vertical to the first display screen.

2. The information display method according to claim 1, wherein that the thumbnail comprises information content extracted from the target information comprises:
    the thumbnail comprises a keyword extracted from the target information in a case where the target information comprises text content; and/or
    the thumbnail comprises a target image extracted from the target information in a case where the target information comprises image content.

3. The information display method according to claim 1, wherein before the displaying, in the information presentation page, the thumbnail corresponding to each piece of target information, the information display method further comprises:
    receiving a second input by the user on the information presentation page;
    displaying a target key in response to the second input; and
    receiving a third input by the user for the target key; and
    the displaying, in the information presentation page, the thumbnail corresponding to each piece of target information comprises:
    displaying, in the information presentation page in response to the third input, the thumbnail corresponding to each piece of target information.

4. The information display method according to claim 1, wherein after the displaying, in the information presentation page, the thumbnail corresponding to each piece of target information, the information display method further comprises:
    receiving a second input by the user selecting a target thumbnail from the thumbnail; and
    updating display content of the information presentation page to first content in response to the second input, wherein the first content comprises first target information corresponding to the target thumbnail.

5. The information display method according to claim 1, wherein
    the receiving the first input by the user comprises:
    receiving a drag input by the user dragging the thumbnail to a display edge of the first screen, and in a case where duration of a drag operation that the thumbnail is dragged to the display edge of the first display screen is greater than specified duration, determining that the first input by the user is received;
    in a case where a double tap of the user on the thumbnail is received, determining that the first input by the user is received; or
    in a case where an obstruction within a first area range is detected in an exterior spatial region of the first display screen, and then it is detected that the area of the obstruction gradually decreases to within a second area range, determining that the first input by the user is received.

6. A terminal, comprising a processor, a memory, and a computer program that is stored in the memory and executable on the processor, wherein the computer program, when executed by the processor causes the terminal to perform:

obtaining target information in an information presentation page, wherein the terminal comprises a first display screen and a second display screen, the information presentation page is displayed on the first display screen, and the information presentation page is used to present information posted by at least one account, and the target information is the information posted by the at least one account; and displaying, in the information presentation page, a thumbnail corresponding to each piece of target information, wherein the thumbnail comprises information content extracted from the target information;

the information presentation page comprises a first display region and a second display region, and the computer program, when executed by the processor, causes the terminal to further perform: displaying, in the first display region of the information presentation page, the thumbnail corresponding to each piece of target information, wherein the first display region comprises at least one display subregion, and each display subregion is used to display one thumbnail;

the information presentation page is used to present information posted by at least one account and comprises: the second display region being used to display the information posted by the at least one account; and the computer program, when executed by the processor, causes the terminal to further perform:

receiving a swipe operation on the information presentation page;

keeping, by the first display region, displaying the thumbnail corresponding to each piece of target information by skipping responding to the swipe operation; and updating, by the second display region, display content in response to the swipe operation; and the computer program, when executed by the processor, causes the terminal to further perform:

receiving a first input by a user; and turning on the second display screen and displaying the thumbnail on the second display screen in response to the first input, wherein the computer program, when executed by the processor, causes the terminal to perform: turning on the second display screen and displaying the thumbnail on the second display screen in response to a gesture of a palm hanging over the first display screen, rotated ninety degrees clockwise, and then vertical to the first screen.

7. The terminal according to claim 6, wherein the computer program, when executed by the processor, causes the terminal to perform:

the thumbnail comprises a keyword extracted from the target information in a case where the target information comprises text content; and/or the thumbnail comprises a target image extracted from the target information in a case where the target information comprises image content.

8. The terminal according to claim 6, wherein the computer program, when executed by the processor, causes the terminal to further perform:

receiving a second input by the user on the information presentation page;

displaying a target key in response to the second input; and receiving a third input by the user for the target key; and the computer program, when executed by the processor, causes the terminal to perform:

displaying, in the information presentation page in response to the third input, the thumbnail corresponding to each piece of target information.

9. The terminal according to claim 6, wherein the computer program, when executed by the processor, causes the terminal to further perform:

receiving a second input by the user selecting a target thumbnail from the thumbnail; and updating display content of the information presentation page to first content in response to the second input, wherein the first content comprises first target information corresponding to the target thumbnail.

10. The terminal according to claim 6, wherein the computer program, when executed by the processor, causes the terminal to perform:

Receiving a drag input by the user dragging the thumbnail to a display edge of the first display screen, and in a case where duration of a drag operation that the thumbnail is dragged to the display edge of the first display screen is greater than specified duration, determining that the first input by the user is received;

in a case where a double tap of the user on the thumbnail is received, determining that the first input by the user is received; or in a case where an obstruction within a first area range is detected in an exterior spatial region of the first display screen, and then it is detected that the area of the obstruction gradually decreases to within a second area range, determining that the first input by the user is received.

11. A non-transitory computer-readable storage medium, storing a computer program, wherein the computer program, when executed by a processor, causes the processor to perform:

obtaining target information in an information presentation page, wherein the terminal comprises a first display screen and a second display screen, the information presentation page is displayed on the first display screen, and the information presentation page is used to present information posted by at least one account, and the target information is the information posted by the at least one account; and displaying, in the information presentation page, a thumbnail corresponding to each piece of target information, wherein the thumbnail comprises information content extracted from the target information;

the information presentation page comprises a first display region and a second display region, and the computer program, when executed by the processor, causes the processor to further perform: displaying, in the first display region of the information presentation page, the thumbnail corresponding to each piece of target information, wherein the first display region comprises at least one display subregion, and each display subregion is used to display one thumbnail;

the information presentation page is used to present information posted by at least one account and comprises: the second display region being used to display the information posted by the at least one account;

the computer program, when executed by the processor, causes the processor to further perform:

receiving a swipe operation on the information presentation page;

keeping, by the first display region, displaying the thumbnail corresponding to each piece of target information by skipping responding to the swipe operation; and updating, by the second display region, display content in response to the swipe operation; and the computer program, when executed by the processor, causes the processor to further perform:

receiving a first input by a user; and turning on the second display screen and displaying the thumbnail on the second display screen in response to the first input, wherein the computer program, when executed by the processor, causes the processor to perform: turning on the second display screen and displaying the thumbnail on the second display screen in response to a gesture of a palm hanging over the first screen, rotated ninety degrees clockwise, and then vertical to the first screen.

12. The non-transitory computer-readable storage medium according to claim 11, wherein the computer program, when executed by the processor, causes the processor to further perform:

receiving a second input by the user on the information presentation page;

displaying a target key in response to the second input; and receiving a third input by the user for the target key; and the computer program, when executed by the processor, causes the terminal to perform:

displaying, in the information presentation page in response to the third input, the thumbnail corresponding to each piece of target information.

13. The non-transitory computer-readable storage medium according to claim 11, wherein the computer program, when executed by the processor, causes the processor to further perform:

receiving a second input by the user selecting a target thumbnail from the thumbnail; and updating display content of the information presentation page to first content in response to the second input, wherein the first content comprises first target information corresponding to the target thumbnail.

* * * * *